(12) United States Patent
Wei

(10) Patent No.: US 8,693,106 B2
(45) Date of Patent: Apr. 8, 2014

(54) ZOOM LENS

(71) Applicant: Tamron Co., Ltd., Saitama (JP)

(72) Inventor: Lai Wei, Saitama (JP)

(73) Assignee: Tamron Co., Ltd., Saitama-shi (JP)

( * ) Notice: Subject to any disclaimer, the term of this patent is extended or adjusted under 35 U.S.C. 154(b) by 0 days.

(21) Appl. No.: 13/761,806

(22) Filed: Feb. 7, 2013

(65) Prior Publication Data

US 2013/0222923 A1 Aug. 29, 2013

(30) Foreign Application Priority Data

Feb. 28, 2012 (JP) ................................. 2012-042554

(51) Int. Cl.
*G02B 15/14* (2006.01)
(52) U.S. Cl.
USPC .......................................... 359/683; 359/676
(58) Field of Classification Search
USPC ................................. 359/676, 683
See application file for complete search history.

(56) References Cited

U.S. PATENT DOCUMENTS

| | | | |
|---|---|---|---|
| 7,525,729 B2* | 4/2009 | Suzaki et al. | 359/557 |
| 7,646,548 B2* | 1/2010 | Ohtake | 359/689 |
| 2013/0021674 A1* | 1/2013 | Fujikura | 359/683 |

FOREIGN PATENT DOCUMENTS

| | | |
|---|---|---|
| JP | 4542933 B2 | 9/2010 |
| JP | 4672860 B2 | 4/2011 |
| JP | 4823680 B2 | 11/2011 |
| JP | 4823684 B2 | 11/2011 |

OTHER PUBLICATIONS

U.S. Appl. No. 13/760,534, filed Feb. 6, 2013, Wei.

* cited by examiner

*Primary Examiner* — Scott J Sugarman
(74) *Attorney, Agent, or Firm* — Foley & Lardner LLP

(57) ABSTRACT

A zoom lens includes sequentially from an object side, a first lens group having a positive refractive power, a second lens group having a negative refractive power, a third lens group having a positive refractive power, a fourth lens group having a positive refractive power, and a fifth lens group having a negative refractive power. The zoom lens satisfies given conditions to implement a compact, large aperture ratio zoom lens having excellent optical performance and compatible with solid state image sensors capable of recording full high vision images.

5 Claims, 8 Drawing Sheets

FIG.2
FIRST EMBODIMENT
(WIDE ANGLE EDGE)
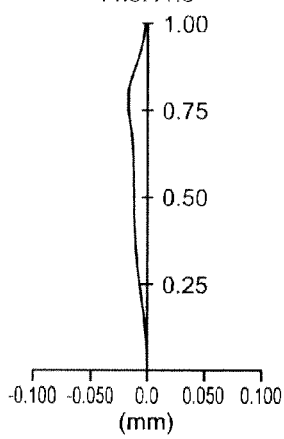
SPHERICAL ABERRATION
Fno. /1.6
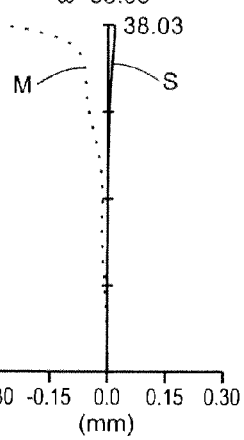
ASTIGMATISM
ω=38.03°
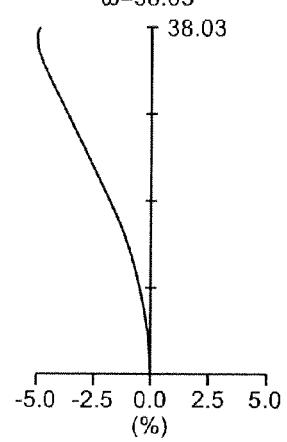
ASTIGMATISM
ω=38.03°
(INTERMEDIATE FOCAL POSITION)
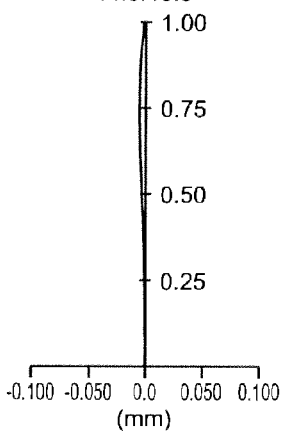
SPHERICAL ABERRATION
Fno. /3.8
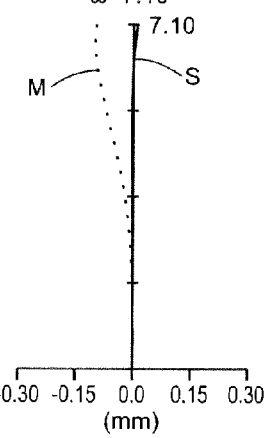
ASTIGMATISM
ω=7.10°
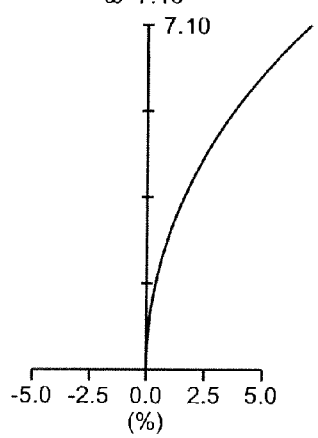
ASTIGMATISM
ω=7.10°
(TELEPHOTO EDGE)
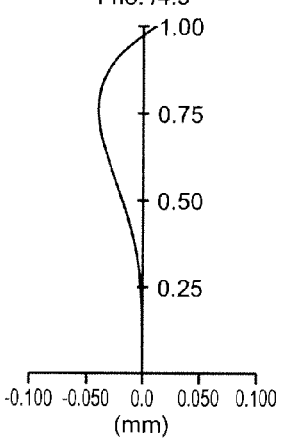
SPHERICAL ABERRATION
Fno. /4.9
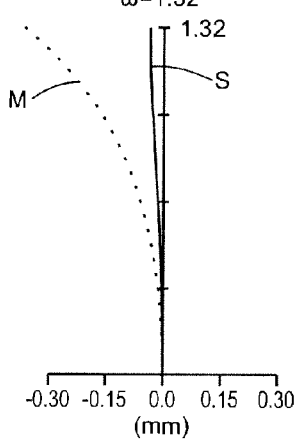
ASTIGMATISM
ω=1.32°
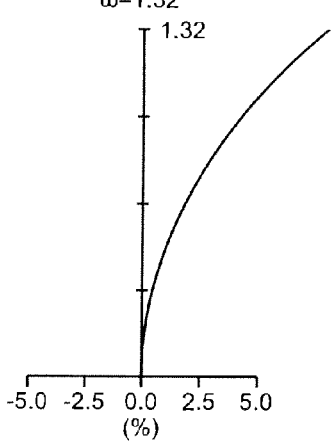
ASTIGMATISM
ω=1.32°

FIG.6
THIRD EMBODIMENT
(WIDE ANGLE EDGE)
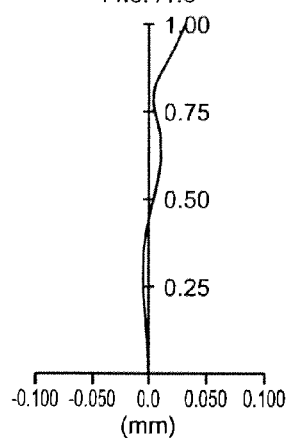
SPHERICAL ABERRATION
Fno. /1.6
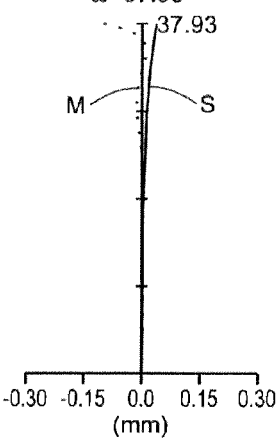
ASTIGMATISM
ω=37.93°
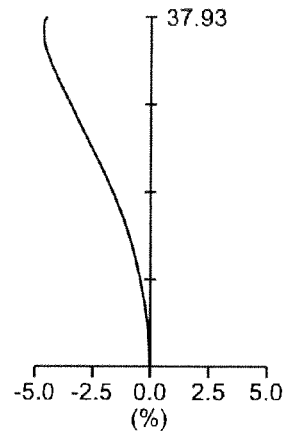
ASTIGMATISM
ω=37.93°
(INTERMEDIATE FOCAL POSITION)
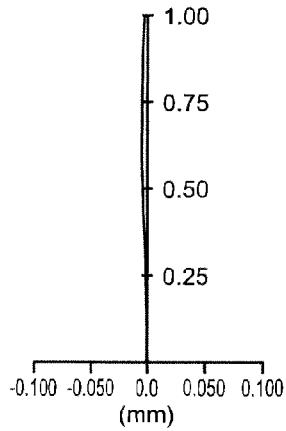
SPHERICAL ABERRATION
Fno. /3.8
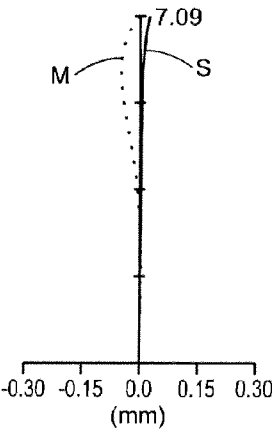
ASTIGMATISM
ω=7.09°
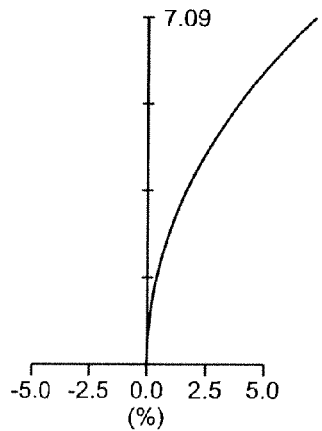
ASTIGMATISM
ω=7.09°
(TELEPHOTO EDGE)
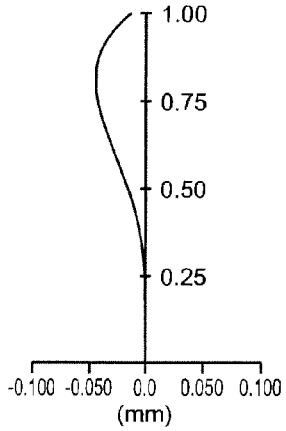
SPHERICAL ABERRATION
Fno. /4.9
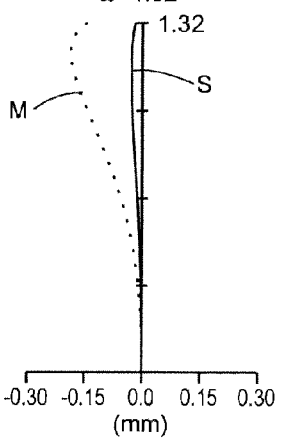
ASTIGMATISM
ω=1.32°
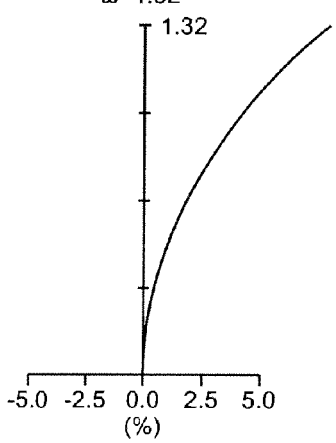
ASTIGMATISM
ω=1.32°

FIG.8
FOURTH EMBODIMENT (WIDE ANGLE EDGE)
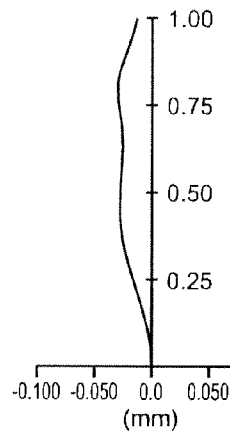
SPHERICAL ABERRATION
Fno. /1.6
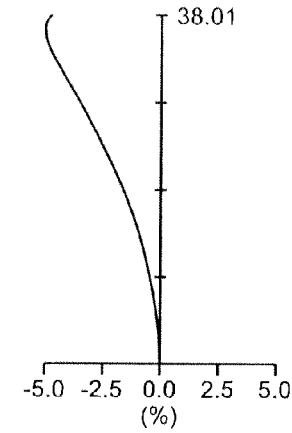
ASTIGMATISM ω=38.01°
ASTIGMATISM ω=38.01°
(INTERMEDIATE FOCAL POSITION)
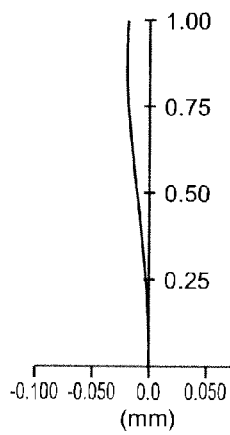
SPHERICAL ABERRATION
Fno. /3.8
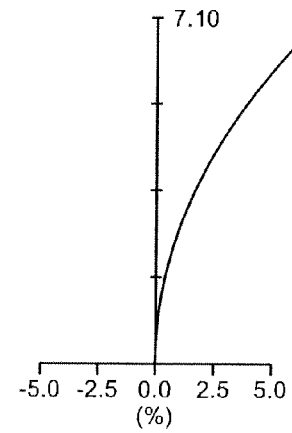
ASTIGMATISM ω=7.10°
ASTIGMATISM ω=7.10°
(TELEPHOTO EDGE)
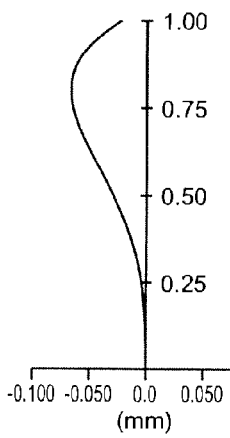
SPHERICAL ABERRATION
Fno. /4.9
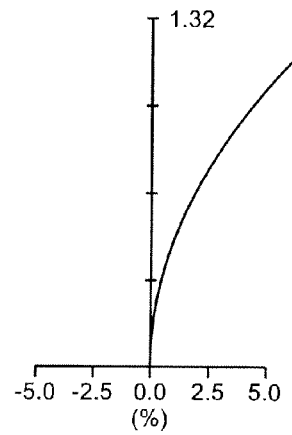
ASTIGMATISM ω=1.32°
ASTIGMATISM ω=1.32°

ZOOM LENS

BACKGROUND OF THE INVENTION

1. Field of the Invention

The present invention relates to a zoom lens suitable for an imaging apparatus equipped with a solid state image sensor, such as digital still camera and a digital video camera.

2. Description of the Related Art

Zoom lenses that are configured by 4 lens groups, capable of high zoom ratios, and used as imaging lens on digital still cameras and digital video cameras equipped with a solid state image sensor such as such as a charge-coupled device (CCD) and a complementary metal-oxide-semiconductor (CMOS) are commonly known (see, for example, Japanese Patent No. 4672860).

The zoom lens recited in Japanese Patent No. 4672860 includes sequentially from a side nearest an object (object side), first to fourth lens groups respectively having a positive, negative, positive, and positive refractive powers. In the zoom lens, the first and third lens groups are stationary, while the second lens group is moved in one direction to perform zooming and the fourth lens group is moved in a back and forth direction to correct image plane variation accompanying zooming and to perform focusing. The zoom ratio of the zoom lens is on the order of 25×; and the maximum angle of view is on the order of 58 degrees. With such a zoom lens formed by 4 lens groups, since there are 2 movable groups, configuration of the lens barrel can be simplified and the size of the lens system overall can be reduced.

A zoom lens that incorporates a stationary fifth lens group into the 4 lens group configuration above is further known (see, for example, Japanese Patent Nos. 4542933, 4823680, and 4823684). The zoom lenses recited in Japanese Patent Nos. 4542933, 4823680, and 4823684 each include from the object side, first to fifth lens groups respectively having a positive, negative, positive, positive, and negative refractive power. In the zoom lenses, the first, third, and fifth lens groups are stationary, while the second lens group is moved in one direction to perform zooming and the fourth lens group is moved in a back and forth direction to correct image plane variation accompanying zooming and to perform focusing.

The zoom ratio of the zoom lens recited in Japanese Patent No. 4542933 is on the order of 30×; and the maximum angle of view is on the order of 60 degrees. The zoom ratio of the zoom lens recited in Japanese Patent No. 4823680 is on the order of 35×; and the maximum angle of view is on the order of 73 degrees. The zoom ratio of the zoom leas recited in Japanese Patent No. 4823604 is on the order of 14×; and the maximum angle of view is on the order of 70 degrees.

Nonetheless, in addition to favorably correcting various types of aberration over the entire zoom range, large aperture ratios for wide angle views enabling the recording of images at dimly lit locations over a wider range are demanded of lens systems for surveillance cameras. Furthermore, accompanying the increased prevalence of solid state image sensors capable of full high vision image recording, lens systems compatible with full high vision solid state image sensors are demanded. Conventionally, demand has increased for a lens system for a surveillance camera equipped with a full high vision solid state image sensor to have extremely high optical performance capable of favorably correcting various types of aberration over the entire zoom range.

As conventional technologies, the zoom lenses above have a problem in that accompanying increased aperture ratios and higher zoom ratios, at the telephoto edge where the zoom ratio is high, image plane curvature becomes prominent when the object distance changes. As a result, particularly at the telephoto edge, as the object distance becomes closer, a peripheral portion of the image gradually becomes out of focus. Of course, the greater the image height, i.e., the larger the size of the solid state image sensor, the more prominent the blur becomes.

SUMMARY OF THE INVENTION

It is an object of the present invention to at least solve the above problems in the conventional technologies.

A zoom lens according to one aspect of the present invention includes sequentially from an object side, a first lens group having a positive refractive power, a second lens group having a negative refractive power, a third lens group having a positive refractive power, a fourth lens group having a positive refractive power, and a fifth lens group having a negative refractive power. The first lens group, the third lens group, and the fifth lens group remain stationary. The second lens group is moved along an optical axis, from the object side toward an image side, whereby zooming from a wide angle edge to a telephoto edge is performed. The fourth lens group is moved along the optical axis, whereby image plane variation accompanying zooming is corrected and focusing is performed. The fifth lens group includes sequentially from the object side, a negative first lens having at least one aspheric surface and a positive second lens. The zoom lens satisfies a conditional expression (1) $1.5<|f51|/Y<3$, and a conditional expression (2) $0.2<|F5/Ft|<0.8$, where, f51 is a focal length of the first lens in the fifth lens group, Y is an image height for the entire optical system, F5 is a focal length of the fifth lens group, and Ft is a focal length of the entire optical system at the telephoto edge.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 2 is a diagram of various types of aberration occurring, with respect to the d-line ($\lambda=587.56$ nm), in the zoom lens according to the first embodiment;

FIG. 6 is a diagram of various types of aberration occurring, with respect to the d-line ($\lambda=587.56$ nm), in the zoom lens according to the third embodiment;

FIG. 8 is a diagram of various types of aberration occurring, with respect to the d-line ($\lambda=587.56$ nm), in the zoom lens according to the fourth embodiment.

DETAILED DESCRIPTION OF THE PREFERRED EMBODIMENTS

Figure 1:
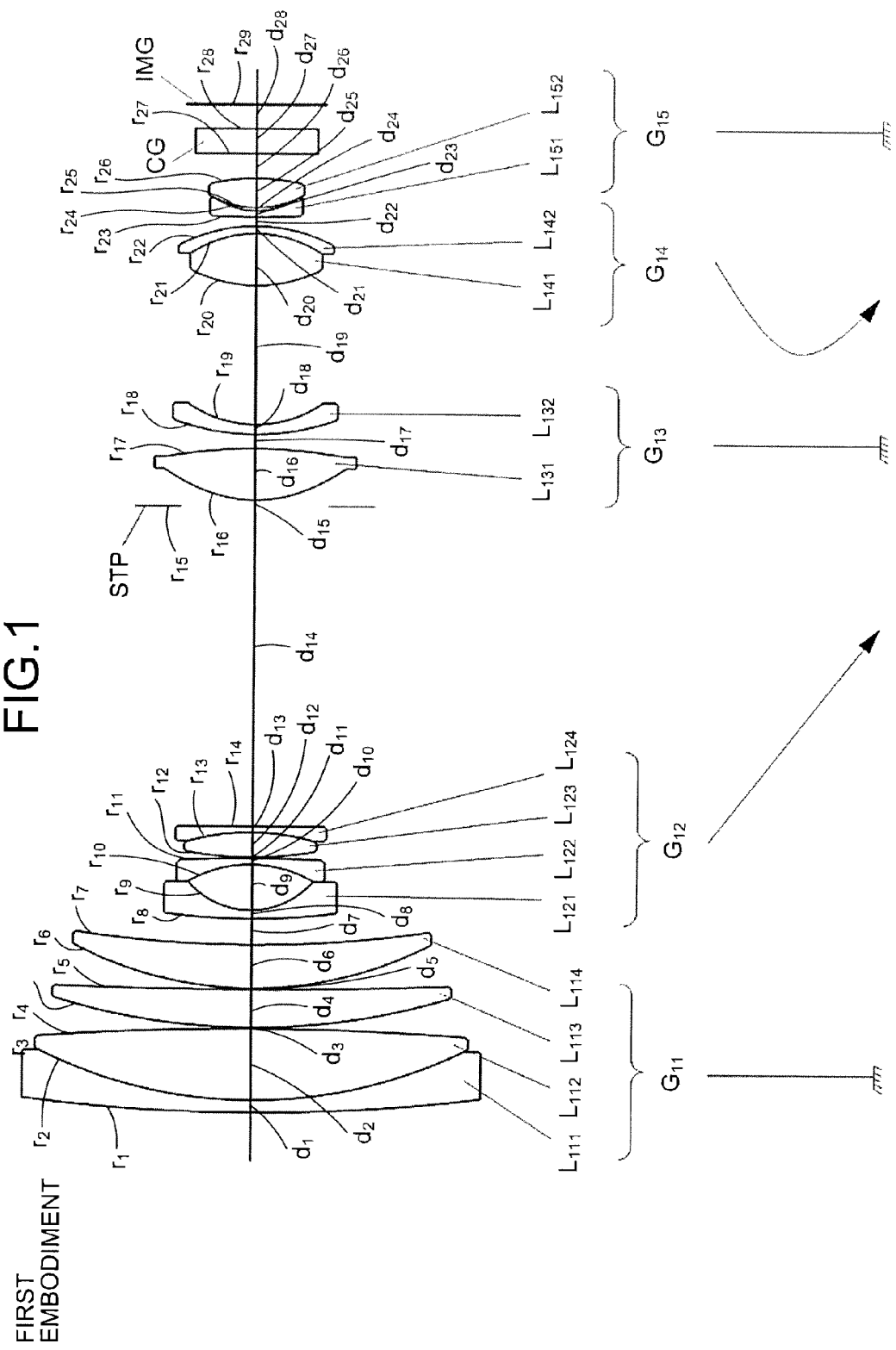
FIG. 1 is a cross sectional view (along the optical axis) of a zoom lens according to a first embodiment.

Preferred embodiments of a zoom lens according to the present invention are explained in detail with reference to the accompanying drawings.

The zoom lens according to the present invention includes sequentially from the object side, a first lens group having a positive refractive power, a second lens group having a negative refractive power, a third lens group having a positive refractive power, a fourth lens group having a positive refractive power, and a fifth lens group having a negative refractive power. The second lens group is moved along an optical axis, whereby zooming is performed from the wide angle edge to the telephoto edge. The fourth lens group is moved along the optical axis whereby image plane variation accompanying zooming is corrected and focusing is performed. The first lens group, the third lens group, and the fifth lens group remain stationary (the configuration above is referred to as a basic configuration).

An object of the present invention is to provide a high zoom ratio zoom lens that is compact, has a large aperture ratio and excellent optical performance, e.g., a zoom lens that is optimal for a compact imaging apparatus equipped with a solid state image sensor capable of recording images in full high vision. To achieve such an object, various conditions are set as indicated below.

In addition to the basic configuration, in the zoom lens according to the present invention, the fifth lens group includes sequentially from the object side, a negative first lens having at least one aspheric surface and a positive second lens. By forming an aspheric surface on the first lens disposed farthest on the object side of the fifth lens group, coma, astigmatism, and image plane curvature that accompany high zoom ratios and large aperture ratios and occur when the object distance changes, can be easily corrected. As a result, the advantages of high zoom ratios and large aperture ratios can be realized.

The zoom lens according to the present invention preferably satisfies the following conditional expressions, where f51 is the focal length of the first lens in the fifth lens group, Y is the image height for the entire optical system, F5 is the focal length of the fifth lens group, and Ft is the focal length of the entire optical system at the telephoto edge.

$$1.5 < |f51|/Y < 3 \quad (1)$$

$$0.2 < |F5/Ft| < 0.8 \quad (2)$$

Conditional expression (1) prescribes a proper range of the ratio of the focal length f51 of the first lens disposed farthest on the object side of the fifth lens group and the image height Y of the entire optical system. Satisfaction of conditional expression (1) establishes a proper refractive power of the negative first lens disposed farthest on the object side of the fifth lens group, enabling implementation of a high-resolution optical system of a high zoom ratio and favorably correcting various types of aberration.

Below the lower limit of conditional expression (1), the negative refractive power of the first lens disposed farthest on the object side of the fifth lens group becomes too strong, making correction of various aberration of a peripheral portion of an image difficult. Meanwhile, above the upper limit of conditional expression (1), the negative refractive power of the first lens disposed farthest on the object side of the fifth lens group becomes too weak, increasing the Petzval sum for the entire fifth lens group and making image plane curvature prominent, whereby a flat imaging plane cannot be obtained. In particular, the correction of chromatic aberration occurring on the telephoto side becomes difficult.

More favorable results can be expected if the zoom lens satisfies conditional expression (1) within the range indicated below.

$$1.7 < |f51|/Y < 2.8 \quad (1a)$$

By satisfying conditional expression (1) within the range prescribed by conditional expression (1a), the zoom lens can more favorably correct various types of aberration of the peripheral portion of an image since the Petzval sum for the entire fifth lens group can be decreased.

Conditional expression (2) prescribes a proper range of the ratio of the focal length F5 of the fifth lens group and the focal length Ft of the entire optical system at the telephoto edge. Below the lower limit of conditional expression (2), the refractive power of the fifth lens group becomes too strong, the exit pupil position on the telephoto side becomes extremely close to the image plane, and relative illumination (shading) deteriorates. Further, spherical aberration and coma on the wide angle side or the telephoto side becomes prominent, inviting drops in resolution. Meanwhile, above the upper limit of conditional expression (2), the refractive power of the fifth lens group becomes too weak, requiring the fourth lens group to be moved over a greater distance to perform focusing and thereby, making size reductions of the optical system difficult.

To achieve high resolution, the zoom lens according to the present invention preferably satisfies the following conditional expression, where nd51 is the refractive index (with respect to the d-line) of the first lens in the fifth lens group and nd52 is refractive index (with respect to the d-line) of the second lens in the fifth lens group.

$$nd51 - nd52 > 0.2 \quad (3)$$

Conditional expression (3) prescribes a proper range of the difference of the refractive indexes (with respect to the d-line) of the negative lens (the first lens) and the positive lens (the second lens) in the fifth lens group. Below the lower limit of conditional expression (3), the Petzval sum for the entire fifth lens group increases and image plane curvature becomes prominent, whereby a flat imaging plane cannot be obtained. As a result, resolution of the optical system drops.

In the zoom lens according to the present invention, the first lens group includes sequentially from the object side, a negative first lens, a positive second lens, a positive third lens, and a positive fourth lens. In the configuration, to favorably correct chromatic aberration at the telephoto edge of the optical system, the first lens and second lens in the first lens group are cemented. In addition, the zoom lens preferably satisfies the following conditional expression, where υd12 is the Abbe number (with respect to the d-line) of the second lens in the first lens group, and υd13 is the Abbe number (with respect to the d-line) of the third lens in the first lens group.

$$υd12 > 75 \quad (4)$$

$$υd13 > 63 \quad (5)$$

Conditional expressions (4) and (5) express conditions necessary to favorably correct chromatic aberration occurring at the telephoto edge of the optical system. Below the lower limit of either conditional expression (4) or conditional expression (5), chromatic aberration occurring at the telephoto edge of the optical system cannot be corrected.

In the zoom lens according to the present invention, the third lens group preferably includes sequentially from the object side, a positive first lens having at least one aspheric surface, and a negative second lens that is a meniscus lens having a convex surface on the object side. Configuration of the third lens group in this manner enables spherical aberration and coma occurring over the entire zoom range to be favorably corrected.

As described, the zoom lens according to the present invention has the configuration described above, enabling size reductions, a greater aperture ratio, and a higher zoom ratio to be achieved as well as favorable correction of various types of aberration over the entire zoom range and compatibility with a solid state image sensor capable of recording full high vision images. In particular, by satisfying the conditions above, the zoom lens enables size reductions, greater aperture ratios, higher zoom ratios, and the maintenance of high optical performance to be achieved.

With reference to the accompanying drawings, embodiments of the zoom lens according to the present invention will be described in detail. Nonetheless, the present invention is not limited by the embodiments below.

FIG. 1 is a cross sectional view (along the optical axis) of the zoom lens according to a first embodiment. The zoom lens includes sequentially from a side nearest a non-depicted object (the object side), a first lens group $G_{11}$ having a positive refractive power, a second lens group $G_{12}$ having a negative refractive power, a third lens group $G_{13}$ having a positive refractive power, a fourth lens group $G_{14}$ having a positive refractive power, and a fifth lens group $G_{15}$ having a negative refractive power.

An aperture stop STP prescribing a given aperture is disposed between the second lens group $G_{12}$ and the third lens group $G_{13}$. A cover glass CG is disposed between the fifth lens group $G_{15}$ and an imaging plane IMG. The cover glass CG is disposed as necessary and may be omitted accordingly. At the image plane IMG, the light receiving surface of a solid state image sensor, such as a CCD and CMOS, is disposed.

The first lens group $G_{11}$ includes sequentially from the object side, a negative first lens $L_{111}$, a positive second lens $L_{112}$, a positive third lens $L_{113}$, and a positive fourth lens $L_{114}$. The first lens $L_{111}$ and the second lens $L_{112}$ are cemented.

The second lens group $G_{12}$ includes sequentially from the object side, a negative first lens $L_{121}$, a negative second lens $L_{122}$, a positive third lens $L_{123}$, and a negative fourth lens $L_{124}$. The first lens $L_{121}$ is a meniscus lens having a convex surface on the object side and both surfaces of the first lens $L_{121}$ are aspheric. The third lens $L_{123}$ and the fourth lens $L_{124}$ are cemented.

The third lens group $G_{13}$ includes sequentially from the object side, a positive first lens $L_{131}$ and a negative second lens $L_{132}$. Both surfaces of the first lens $L_{131}$ are aspheric. The second lens $L_{132}$ is a meniscus lens having a convex surface on the object side.

The fourth lens group $G_{14}$ includes sequentially from the object side, a positive first lens $L_{141}$ and a negative second lens $L_{142}$. The surface on the object side of the first lens $L_{111}$ aspheric. The first lens $L_{141}$ and the second lens $L_{142}$ are cemented.

The fifth lens group $G_{15}$ includes sequentially from the object side, a negative first lens $L_{151}$ and a positive second lens $L_{152}$. Both surfaces of the first lens $L_{151}$ are aspheric.

The second lens group $G_{12}$ is moved along the optical axis from the object side toward the imaging plane IMG side, whereby the zoom lens zooms from the wide angle edge to the telephoto edge. The fourth lens group $G_{14}$ is moved along the optical axis, whereby the zoom lens corrects image plane variations accompanying zooming and performs focusing. The first lens group $G_{11}$, the third lens group $G_{13}$, and the fifth lens group $G_{15}$ remain stationary.

Here, various values related to the zoom lens according to the first embodiment are given.

---

Focal length of entire lens system = 4.3 (wide angle edge) to 24.0 (intermediate focal position) to 129.0 (Ft: telephoto edge)
F number = 1.6 (wide angle edge) to 3.8 (intermediate focal position) to 4.9 (telephoto edge)
Half-angle ($\omega$) = 38.03 (wide angle edge) to 7.10 (intermediate focal position) to 1.32 (telephoto edge)

(Lens Data)

$r_1 = 155.252$
$d_1 = 1.00$   $nd_1 = 1.84666$   $vd_1 = 23.78$
$r_2 = 40.511$
$d_2 = 5.75$   $nd_2 = 1.49700$   $vd_2 = 81.60$
$r_3 = -245.543$
$d_3 = 0.10$
$r_4 = 55.154$
$d_4 = 3.20$   $nd_3 = 1.59282$   $vd_3 = 68.63$
$r_5 = 382.377$
$d_5 = 0.10$
$r_6 = 31.841$
$d_6 = 3.50$   $nd_4 = 1.83481$   $vd_4 = 42.72$
$r_7 = 95.333$
$d_7 = D(7)$ (variable)
$r_8 = 73.450$ (aspheric)
$d_8 = 0.70$   $nd_5 = 1.85135$   $vd_5 = 40.10$
$r_9 = 6.869$ (aspheric)
$d_9 = 3.52$
$r_{10} = -11.337$
$d_{10} = 0.50$   $nd_6 = 1.88300$   $vd_6 = 40.80$
$r_{11} = 339.750$
$d_{11} = 0.10$
$r_{12} = 23.770$
$d_{12} = 2.00$   $nd_7 = 1.95906$   $vd_7 = 17.47$
$r_{13} = -24.162$
$d_{13} = 0.50$   $nd_8 = 1.88300$   $vd_8 = 40.80$
$r_{14} = 104.181$
$d_{14} = D(14)$ (variable)
$r_{15} = \infty$ (aperture stop)
$d_{15} = 0.50$
$r_{16} = 11.539$ (aspheric)
$d_{16} = 4.20$   $nd_9 = 1.61881$   $vd_9 = 63.85$
$r_{17} = -30.000$ (aspheric)
$d_{17} = 0.10$
$r_{18} = 19.101$
$d_{18} = 0.80$   $nd_{10} = 2.001$   $vd_{10} = 29.13$
$r_{19} = 10.836$
$d_{19} = D(19)$ (variable)
$r_{20} = 12.791$ (aspheric)
$d_{20} = 4.20$   $nd_{11} = 1.4971$   $vd_{11} = 81.56$
$r_{21} = -9.500$
$d_{21} = 0.60$   $nd_{12} = 1.90366$   $vd_{12} = 31.31$
$r_{22} = -14.070$
$d_{22} = D(22)$ (variable)
$r_{23} = 28.595$ (aspheric)
$d_{23} = 0.50$   $nd_{13} = 1.85135$   $vd_{13} = 40.10$
$r_{24} = 5.300$ (aspheric)
$d_{24} = 0.30$
$r_{25} = 7.909$
$d_{25} = 2.26$   $nd_{14} = 1.56732$   $vd_{14} = 42.80$
$r_{26} = -16.411$
$d_{26} = 1.00$
$r_{27} = \infty$
$d_{27} = 2.00$   $nd_{15} = 1.51633$   $vd_{15} = 64.14$
$r_{28} = \infty$
$d_{28} = 3.50$
$r_{29} = \infty$ (imaging plane)

Constants of the cone (k) and aspheric coefficients (A, B, C, D)

(eighth plane)

k = 0,
A = $-4.57687 \times 10^{-5}$, B = $6.79061 \times 10^{-6}$,
C = $-2.31578 \times 10^{-7}$, D = $2.42224 \times 10^{-9}$ (ninth plane)

k = 0.5967,
A = $-3.17031 \times 10^{-4}$, B = $-4.17155 \times 10^{-6}$,
C = $5.67706 \times 10^{-7}$, D = $-3.92278 \times 10^{-8}$ -continued Focal length of entire lens system = 4.3 (wide angle edge) to 24.0 (intermediate focal position) to 129.0 (Ft: telephoto edge)
F number = 1.6 (wide angle edge) to 3.8 (intermediate focal position) to 4.9 (telephoto edge)
Half-angle (ω) = 38.03 (wide angle edge) to 7.10 (intermediate focal position) to 1.32 (telephoto edge)

(sixteenth plane)

$k = -0.1306$,
$A = -4.08183 \times 10^{-5}$, $B = -1.15089 \times 10^{-6}$,
$C = 1.15662 \times 10^{-8}$, $D = -6.70182 \times 10^{-11}$
(seventeenth plane)

$k = -8.2910$,
$A = 7.81968 \times 10^{-5}$, $B = -1.89538 \times 10^{-6}$,
$C = 2.76889 \times 10^{-8}$, $D = -1.55839 \times 10^{-10}$
(twentieth plane)

$k = -0.1487$,
$A = -4.90625 \times 10^{-5}$, $B = -1.02186 \times 10^{-6}$,
$C = 5.04342 \times 10^{-10}$, $D = 4.85594 \times 10^{-10}$
(twenty-third plane)

$k = 0$,
$A = -4.98290 \times 10^{-4}$, $B = -1.45444 \times 10^{-5}$,
$C = 3.32964 \times 10^{-6}$, $D = -1.57350 \times 10^{-7}$
(twenty-fourth plane)

$k = -0.1993$,
$A = -4.77089 \times 10^{-4}$, $B = -3.50309 \times 10^{-5}$,
$C = 3.89261 \times 10^{-6}$, $D = -2.07190 \times 10^{-7}$ (Zoom Data)

| | wide angle edge | intermediate focal position | telephoto edge |
|---|---|---|---|
| D(7) | 0.719 | 19.460 | 27.823 |
| D(14) | 28.930 | 10.189 | 1.825 |
| D(19) | 10.283 | 4.604 | 14.356 |
| D(22) | 4.687 | 10.366 | 0.614 |

(Values related to conditional expression (1))
f51 (focal length of first lens $L_{151}$) = −7.718
Y (image height) = 3.4
|f51|/Y = 2.27
(Values related to conditional expression (2))
F5 (focal length of fifth lens group $G_{15}$) = −58.051
|F5/Ft| = 0.45
(Values related to conditional expression (3))
nd51 (refractive index of first lens $L_{151}$, with respect to d-line) = 1.85135
nd52 (refractive index of second lens $L_{152}$, with respect to d-line) = 1.56732
nd51 − nd52 = 0.284
(Values related to conditional expression (4))
vd12 (Abbe number of second lens $L_{112}$, with respect to d-line) = 81.60
(Values related to conditional expression (5))
vd13 (Abbe number of third lens $L_{113}$, with respect to d-line) = 68.63

FIG. 2 is a diagram of various types of aberration occurring, with respect to the d-line (λ=587.56 nm), in the zoom lens according to the first embodiment. S and M shown with respect to astigmatism, respectively indicate aberration at the sagittal image plane and at the meridonal image plane.

Figure 3:
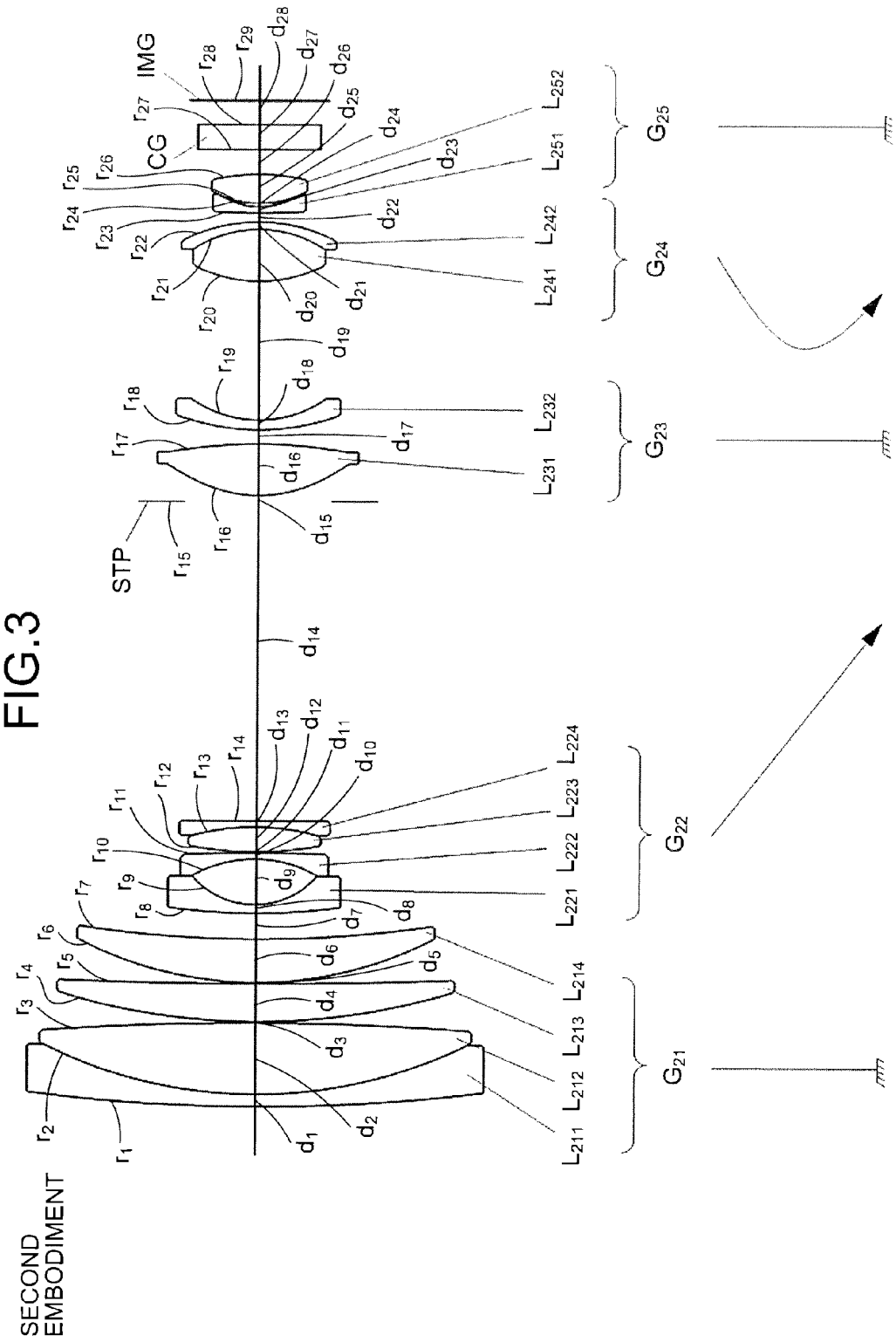
FIG. 3 is a cross sectional view (along the optical axis) of the zoom lens according to a second embodiment.

FIG. 3 is a cross sectional view (along the optical axis) of the zoom lens according to a second embodiment. The zoom lens includes sequentially from the object side, a first lens group $G_{21}$ having a positive refractive power, a second lens group $G_{22}$ having a negative refractive power, a third lens group $G_{23}$ having a positive refractive power, a fourth lens group $G_{24}$ having a positive refractive power, and a fifth lens group $G_{25}$ having a negative refractive power.

The aperture stop STP prescribing a given aperture is disposed between the second lens group $G_{22}$ and the third lens group $G_{23}$. The cover glass CG is disposed between the fifth lens group $G_{25}$ and the imaging plane IMG. The cover glass CG is disposed as necessary and may be omitted accordingly.

At the image plane IMG, the light receiving surface of a solid state image sensor, such as a CCD and CMOS, is disposed.

The first lens group $G_{21}$ includes sequentially from the object side, a negative first lens $L_{211}$, a positive second lens $L_{212}$, a positive third lens $L_{213}$, and a positive fourth lens $L_{214}$. The first lens $L_{211}$ and the second lens $L_{212}$ are cemented.

The second lens group $G_{22}$ includes sequentially from the object side, a negative first lens $L_{221}$, a negative second lens $L_{222}$, a positive third lens $L_{223}$, and a negative fourth lens $L_{224}$. The first lens $L_{221}$ is a meniscus lens having a convex surface on the object side and both surfaces of the first lens $L_{221}$ are aspheric. The third lens $L_{223}$ and the fourth lens $L_{224}$ are cemented.

The third lens group $G_{23}$ includes sequentially from the object side, a positive first lens $L_{231}$ and a negative second lens $L_{232}$. Both surfaces of the first lens $L_{231}$ are aspheric. The second lens $L_{232}$ is a meniscus lens having a convex surface on the object side.

The fourth lens group $G_{24}$ includes sequentially from the object side, a positive first lens $L_{241}$ and a negative second lens $L_{242}$. The surface on the object side of the first lens $L_{241}$ is aspheric. The first lens $L_{241}$ and the second lens $L_{242}$ are cemented.

The fifth lens group $G_{25}$ includes sequentially from the object side, a negative first lens $L_{251}$ and a positive second lens $L_{252}$. Both surfaces of the first lens $L_{251}$ are aspheric.

The second lens group $G_{22}$ is moved along the optical axis from the object side toward the imaging plane IMG side, whereby the zoom lens zooms from the wide angle edge to the telephoto edge. The fourth lens group $G_{24}$ is moved along the optical axis, whereby the zoom lens corrects image plane variations accompanying zooming and performs focusing. The first group $G_{21}$, the third lens group $G_{23}$, and the fifth lens group $G_{25}$ remain stationary.

Here, various values related to the zoom lens according to second embodiment are given.

Focal length of entire lens system = 4.3 (wide angle edge) to 24.0 (intermediate focal position) to 129.0 (Ft: telephoto edge)
F number = 1.6 (wide angle edge) to 3.8 (intermediate focal position) to 4.9 (telephoto edge)
Half-angle (ω) = 38.09 (wide angle edge) to 7.07 (intermediate focal position) to 1.32 (telephoto edge)

(Lens Data)

| | | |
|---|---|---|
| $r_1 = 261.122$ | | |
| $d_1 = 1.00$ | $nd_1 = 1.84666$ | $vd_1 = 23.78$ |
| $r_2 = 41.992$ | | |
| $d_2 = 6.00$ | $nd_2 = 1.43700$ | $vd_2 = 95.10$ |
| $r_3 = -142.792$ | | |
| $d_3 = 0.10$ | | |
| $r_4 = 57.592$ | | |
| $d_4 = 3.34$ | $nd_3 = 1.61800$ | $vd_3 = 63.39$ |
| $r_5 = 1461.086$ | | |
| $d_5 = 0.10$ | | |
| $r_6 = 31.613$ | | |
| $d_6 = 3.50$ | $nd_4 = 1.88300$ | $vd_4 = 40.80$ |
| $r_7 = 91.274$ | | |
| $d_7 = D(7)$ (variable) | | |
| $r_8 = 17.271$ (aspheric) | | |
| $d_8 = 0.70$ | $nd_5 = 1.85135$ | $vd_5 = 40.10$ |
| $r_9 = 5.629$ (aspheric) | | |
| $d_9 = 3.82$ | | |
| $r_{10} = -11.166$ | | |
| $d_{10} = 0.50$ | $nd_6 = 1.88300$ | $vd_6 = 40.80$ |
| $r_{11} = 67.816$ | | |
| $d_{11} = 0.10$ | | |
| $r_{12} = 19.434$ | | |
| $d_{12} = 2.06$ | $nd_7 = 1.95906$ | $vd_7 = 17.47$ |
| $r_{13} = -27.282$ | | |

-continued

Focal length of entire lens system = 4.3 (wide angle edge) to 24.0 (intermediate focal position) to 129.0 (Ft: telephoto edge)
F number = 1.6 (wide angle edge) to 3.8 (intermediate focal position) to 4.9 (telephoto edge)
Half-angle (ω) = 38.09 (wide angle edge) to 7.07 (intermediate focal position) to 1.32 (telephoto edge)

| | | |
|---|---|---|
| $d_{13} = 0.50$ | $nd_8 = 1.88300$ | $vd_8 = 40.80$ |
| $r_{14} = 63.676$ | | |
| $d_{14} = D(14)$ (variable) | | |
| $r_{15} = \infty$ (aperture stop) | | |
| $d_{15} = 0.50$ | | |
| $r_{16} = 11.267$ (aspheric) | | |
| $d_{16} = 4.40$ | $nd_9 = 1.61881$ | $vd_9 = 63.85$ |
| $r_{17} = -25.469$ (aspheric) | | |
| $d_{17} = 0.10$ | | |
| $r_{18} = 21.986$ | | |
| $d_{18} = 0.60$ | $nd_{10} = 2.001$ | $vd_{10} = 29.13$ |
| $r_{19} = 11.300$ | | |
| $d_{19} = D(19)$ (variable) | | |
| $r_{20} = 13.021$ (aspheric) | | |
| $d_{20} = 4.18$ | $nd_{11} = 1.4971$ | $vd_{11} = 81.56$ |
| $r_{21} = -10.019$ | | |
| $d_{21} = 0.60$ | $nd_{12} = 1.90366$ | $vd_{12} = 31.31$ |
| $r_{22} = -13.773$ | | |
| $d_{22} = D(22)$ (variable) | | |
| $r_{23} = 24.019$ (aspheric) | | |
| $d_{23} = 0.50$ | $nd_{13} = 1.85135$ | $vd_{13} = 40.10$ |
| $r_{24} = 5.699$ (aspheric) | | |
| $d_{24} = 0.54$ | | |
| $r_{25} = 16.318$ | | |
| $d_{25} = 2.11$ | $nd_{14} = 1.51633$ | $vd_{14} = 64.14$ |
| $r_{26} = -10.039$ | | |
| $d_{26} = 1.00$ | | |
| $r_{27} = \infty$ | | |
| $d_{27} = 2.00$ | $nd_{15} = 1.51633$ | $vd_{15} = 64.14$ |
| $r_{28} = \infty$ | | |
| $d_{28} = 3.50$ | | |
| $r_{29} = \infty$ (imaging plane) | | |

Constants of the cone (k) and aspheric coefficients (A, B, C, D)

(eighth plane)

$k = 0$,
$A = -6.21082 \times 10^{-4}$, $B = 1.34413 \times 10^{-5}$,
$C = -1.99187 \times 10^{-7}$, $D = 1.35410 \times 10^{-9}$
(ninth plane)

$k = -0.0060$,
$A = -7.63715 \times 10^{-4}$, $B = -1.36437 \times 10^{-5}$,
$C = 7.63607 \times 10^{-7}$, $D = -2.94908 \times 10^{-8}$
(sixteenth plane)

$k = -0.2311$,
$A = -6.05478 \times 10^{-5}$, $B = -1.25340 \times 10^{-6}$,
$C = 1.67144 \times 10^{-8}$, $D = -8.95523 \times 10^{-11}$
(seventeenth plane)

$k = -4.7687$,
$A = 6.98644 \times 10^{-5}$, $B = -1.72352 \times 10^{-6}$,
$C = 2.91064 \times 10^{-8}$, $D = -1.70266 \times 10^{-10}$
(twentieth plane)

$k = -0.4887$,
$A = -7.75303 \times 10^{-5}$, $B = -4.64307 \times 10^{-7}$,
$C = -4.68979 \times 10^{-11}$, $D = 2.32383 \times 10^{-10}$
(twenty-third plane)

$k = 0$,
$A = -6.68416 \times 10^{-4}$, $B = -3.85322 \times 10^{-5}$,
$C = 7.43212 \times 10^{-7}$, $D = 6.05435 \times 10^{-8}$
(twenty-fourth plane)

$k = -0.2788$,
$A = -4.36169 \times 10^{-4}$, $B = -7.39966 \times 10^{-5}$,
$C = 1.04310 \times 10^{-6}$, $D = 8.94196 \times 10^{-8}$ -continued Focal length of entire lens system = 4.3 (wide angle edge) to 24.0 (intermediate focal position) to 129.0 (Ft: telephoto edge)
F number = 1.6 (wide angle edge) to 3.8 (intermediate focal position) to 4.9 (telephoto edge)
Half-angle (ω) = 38.09 (wide angle edge) to 7.07 (intermediate focal position) to 1.32 (telephoto edge)

(Zoom Data)

| | wide angle edge | intermediate focal position | telephoto edge |
|---|---|---|---|
| D(7) | 0.600 | 19.459 | 27.778 |
| D(14) | 29.021 | 10.161 | 1.843 |
| D(19) | 9.668 | 4.480 | 13.573 |
| D(22) | 4.508 | 9.697 | 0.604 |

(Values related to conditional expression (1))
f51 (focal length of first lens $L_{251}$) = −8.889
Y (image height) = 3.4
|f51|/Y = 2.614
(Values related to conditional expression (2))
F5 (focal length of fifth lens group $G_{25}$) = −51.206
|F5/Ft| = 0.397
(Values related to conditional expression (3))
nd51 (refractive index of first lens $L_{251}$, with respect to d-line) = 1.85135
nd52 (refractive index of second lens $L_{252}$, with respect to d-line) = 1.51633
nd51 − nd52 = 0.335
(Values related to conditional expression (4))
vd12 (Abbe number of second lens $L_{212}$, with respect to d-line) = 95.10
(Values related to conditional expression (5))
vd13 (Abbe number of third lens $L_{213}$, with respect to d-line) = 63.39

Figure 4:
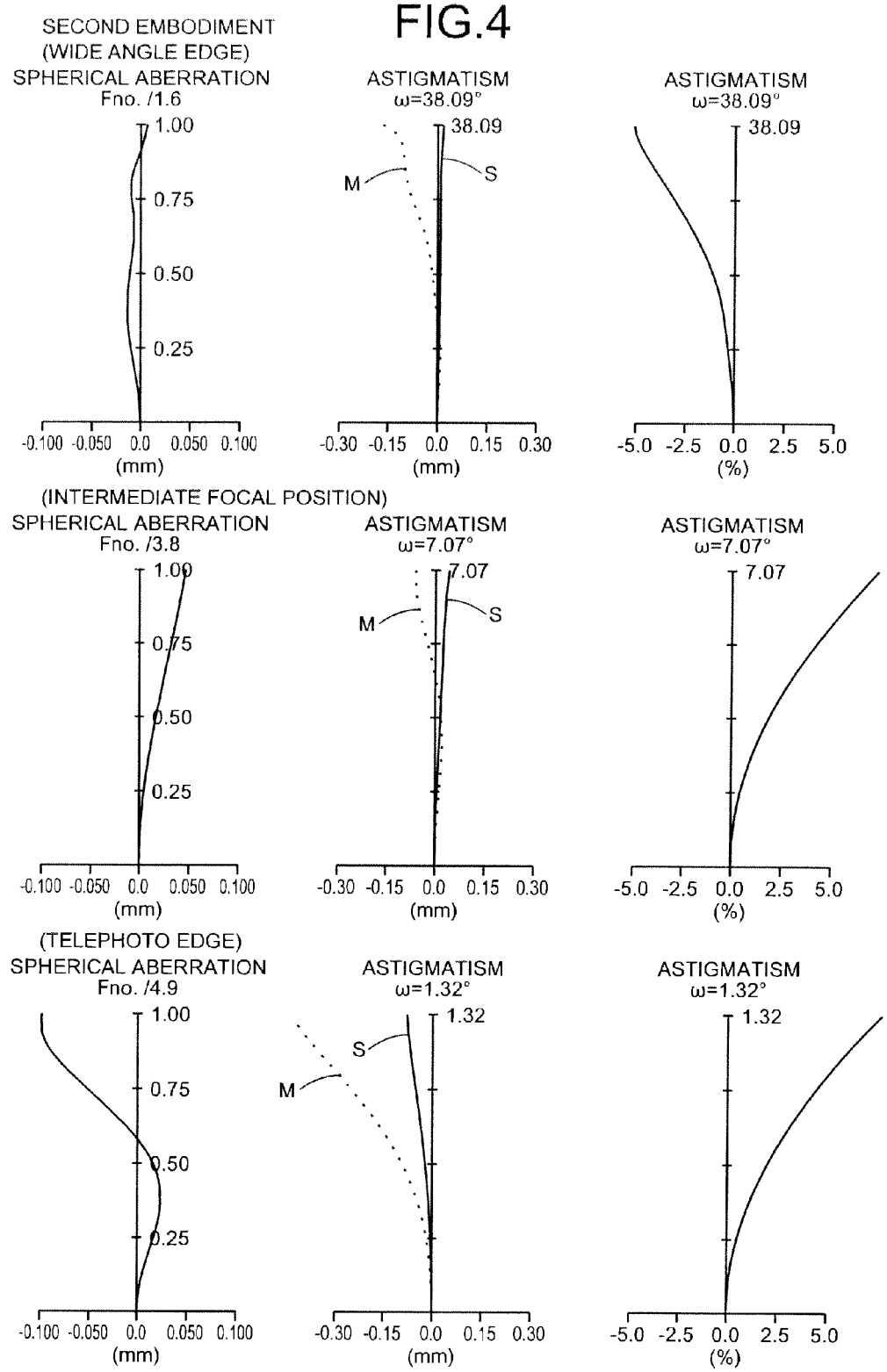
FIG. 4 is a diagram of various types of aberration occurring, with respect to the d-line ($\lambda=587.56$ nm), in the zoom lens according to the second embodiment.

FIG. 4 is a diagram of various types of aberration occurring, with respect to the d-line (λ=587.56 nm), in the zoom lens according to the second embodiment. S and M shown with respect to astigmatism, respectively indicate aberration at the sagittal image plane and at the meridonal image plane.

Figure 5:
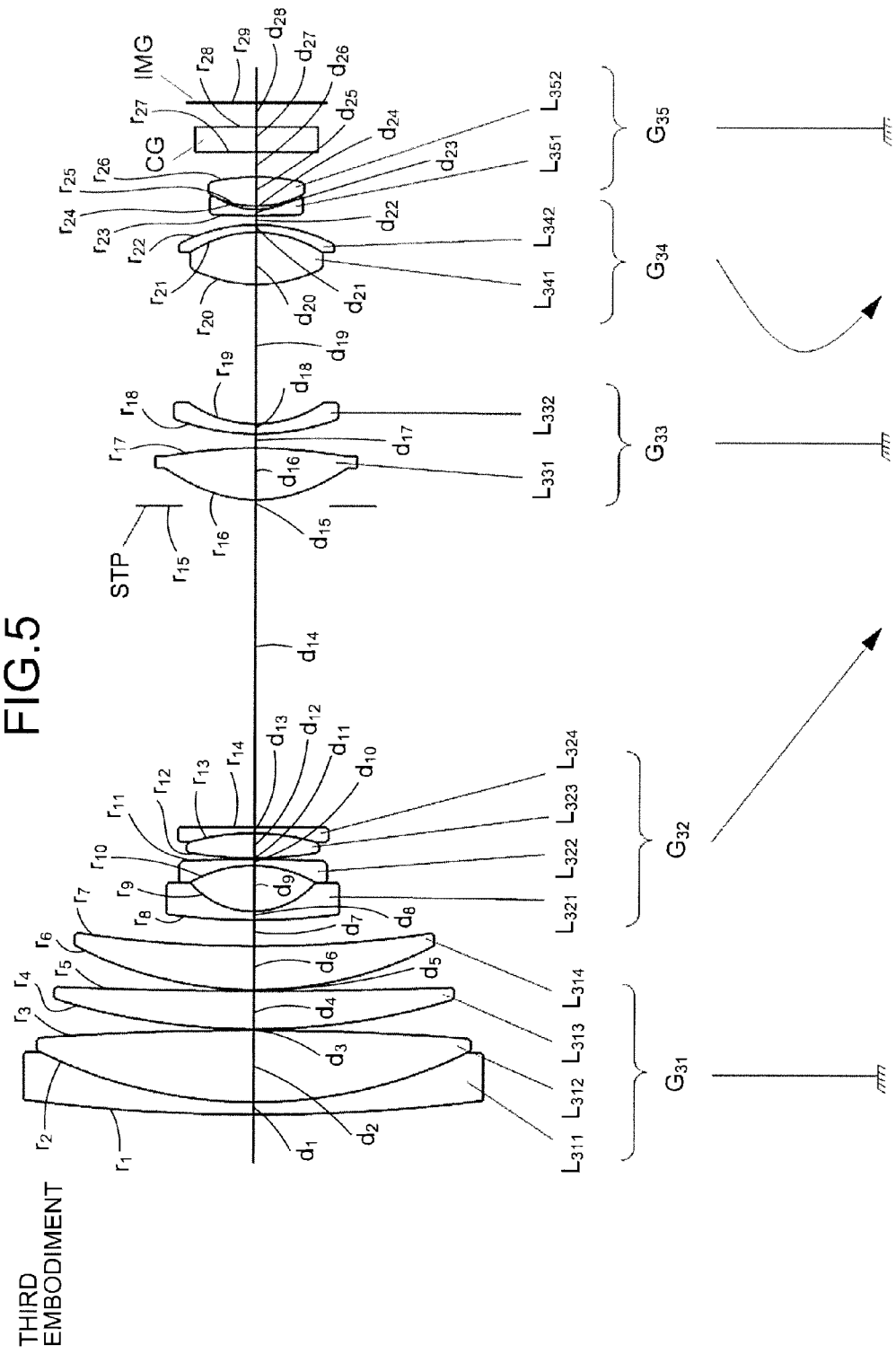
FIG. 5 is a cross sectional view (along the optical axis) of the zoom lens according to a third embodiment.

FIG. 5 is a cross sectional view (along the optical axis) of the zoom lens according to a third embodiment. The zoom lens includes sequentially from the object side, a first lens group $G_{31}$ having a positive refractive power, a second lens group $G_{32}$ having a negative refractive power, a third lens group $G_{33}$ having a positive refractive power, a fourth lens group $G_{34}$ having a positive refractive power, and a fifth lens group $G_{35}$ having a negative refractive power.

The aperture stop STP prescribing a given aperture is disposed between the second lens group $G_{32}$ and the third lens group $G_{33}$. The cover glass CG is disposed between the fifth lens group $G_{35}$ and the imaging plane IMG. The cover glass CG is disposed as necessary and may be omitted accordingly. At the image plane IMG, the light receiving surface of a solid state image sensor, such as a CCD and CMOS, is disposed.

The first lens group $G_{31}$ includes sequentially from the object side, a negative first lens $L_{311}$, a positive second lens $L_{312}$, a positive third lens $L_{313}$, and a positive fourth lens $L_{314}$. The first lens $L_{311}$ and the second lens $L_{312}$ are cemented.

The second lens group $G_{32}$ includes sequentially from the object side, a negative first lens $L_{321}$, a negative second lens $L_{322}$, a positive third lens $L_{323}$, and a negative fourth lens $L_{324}$. The first lens $L_{321}$ is a meniscus lens having a convex surface on the object side and both surfaces of the first lens $L_{321}$ are aspheric. The third lens $L_{323}$ and the fourth lens $L_{324}$ are cemented.

The third lens group $G_{33}$ includes sequentially from the object side, a positive first lens $L_{331}$ and a negative second lens $L_{332}$. Both surfaces of the first lens $L_{331}$ as aspheric. The second lens $L_{332}$ is a meniscus lens having a convex surface on the object side.

The fourth lens group $G_{34}$ includes sequentially from the object side, a positive first lens $L_{341}$ and a negative second lens $L_{342}$. The surface on the object side of the first lens $L_{341}$ is aspheric. The first lens $L_{341}$ and the second lens $L_{342}$ are cemented.

The fifth lens group $G_{35}$, includes sequentially from the object side, a negative first lens $L_{351}$ and a positive second lens $L_{352}$. Both surfaces of the first lens $L_{351}$ are aspheric.

The second lens group $G_{32}$ is moved along the optical axis from the object side toward the imaging plane IMG side, whereby the zoom lens zooms from the wide angle edge to the telephoto edge. The fourth lens group $G_{34}$ is moved along the optical axis, whereby the zoom lens corrects image plane variations accompanying zooming and performs focusing. The first lens group $G_{31}$, the third lens group $G_{33}$, and the fifth lens group $G_{35}$ remain stationary.

Here, various values related to the zoom lens according to the third embodiment are given.

Focal length of entire lens system = 4.3 (wide angle edge) to 24.0 (intermediate focal position) to 129.0 (Ft: telephoto edge)
F number = 1.6 (wide angle edge) to 3.8 (intermediate focal position) to 4.9 (telephoto edge)
Half-angle (ω) = 37.93 (wide angle edge) to 7.09 (intermediate focal position) to 1.32 (telephoto edge)

(Lens Data)

$r_1 = 143.132$
$d_1 = 1.00$    $nd_1 = 1.84666$    $vd_1 = 23.78$
$r_2 = 40.225$
$d_2 = 5.80$    $nd_2 = 1.43700$    $vd_2 = 95.10$
$r_3 = -220.562$
$d_3 = 0.10$
$r_4 = 57.824$
$d_4 = 3.28$    $nd_3 = 1.59282$    $vd_3 = 68.63$
$r_5 = 575.311$
$d_5 = 0.10$
$r_6 = 32.258$
$d_6 = 3.68$    $nd_4 = 1.83481$    $vd_4 = 42.72$
$r_7 = 106.337$
$d_7 = D(7)$ (variable)
$r_8 = 53.938$ (aspheric)
$d_8 = 0.70$    $nd_5 = 1.85135$    $vd_5 = 40.10$
$r_9 = 6.852$ (aspheric)
$d_9 = 3.63$
$r_{10} = -10.409$
$d_{10} = 0.50$    $nd_6 = 1.88300$    $vd_6 = 40.80$
$r_{11} = -119.311$
$d_{11} = 0.10$
$r_{12} = 32.375$
$d_{12} = 1.99$    $nd_7 = 1.95906$    $vd_7 = 17.47$
$r_{13} = -18.558$
$d_{13} = 0.50$    $nd_8 = 1.88300$    $vd_8 = 40.80$
$r_{14} = 246.052$
$d_{14} = D(14)$ (variable)
$r_{15} = \infty$ (aperture stop)
$d_{15} = 0.50$
$r_{16} = 11.250$ (aspheric)
$d_{16} = 4.50$    $nd_9 = 1.61881$    $vd_9 = 63.85$
$r_{17} = -25.151$ (aspheric)
$d_{17} = 0.14$
$r_{18} = 25.680$
$d_{18} = 0.70$    $nd_{10} = 2.001$    $vd_{10} = 29.13$
$r_{19} = 12.179$
$d_{19} = D(19)$ (variable)
$r_{20} = 12.463$ (aspheric)
$d_{20} = 4.21$    $nd_{11} = 1.4971$    $vd_{11} = 81.56$
$r_{21} = -10.285$
$d_{21} = 0.60$    $nd_{12} = 1.90366$    $vd_{12} = 31.31$
$r_{22} = -14.345$
$d_{22} = D(22)$ (variable)
$r_{23} = 34.622$ (aspheric)
$d_{23} = 0.50$    $nd_{13} = 1.85135$    $vd_{13} = 40.10$
$r_{24} = 4.280$ (aspheric)
$d_{24} = 0.11$
$r_{25} = 5.105$ -continued Focal length of entire lens system = 4.3 (wide angle edge) to 24.0 (intermediate focal position) to 129.0 (Ft: telephoto edge)
F number = 1.6 (wide angle edge) to 3.8 (intermediate focal position) to 4.9 (telephoto edge)
Half-angle (ω) = 37.93 (wide angle edge) to 7.09 (intermediate focal position) to 1.32 (telephoto edge)

$d_{25} = 2.54$
$r_{26} = -18.427$
$d_{26} = 1.00$    $nd_{14} = 1.54814$    $vd_{14} = 45.82$
$r_{27} = \infty$
$d_{27} = 2.00$    $nd_{15} = 1.51633$    $vd_{15} = 64.14$
$r_{28} = \infty$
$d_{28} = 3.50$
$r_{29} = \infty$ (imaging plane)

Constants of the cone (k) and aspheric coefficients (A, B, C, D)

(eighth plane)

$k = 0$,
$A = -1.10104 \times 10^{-4}$, $B = 6.86574 \times 10^{-6}$,
$C = -1.80314 \times 10^{-7}$, $D = 1.77529 \times 10^{-9}$
(ninth plane)

$k = 0.5559$,
$A = -3.93632 \times 10^{-4}$, $B = -6.30197 \times 10^{-6}$,
$C = 4.84720 \times 10^{-7}$, $D = -2.99161 \times 10^{-8}$
(sixteenth plane)

$k = -0.1935$,
$A = -5.34967 \times 10^{-5}$, $B = -1.15951 \times 10^{-6}$,
$C = 1.21900 \times 10^{-8}$, $D = -9.39982 \times 10^{-11}$
(seventeenth plane)

$k = -6.7682$,
$A = 7.38246 \times 10^{-5}$, $B = -1.90295 \times 10^{-6}$,
$C = 2.73786 \times 10^{-8}$, $D = -1.67159 \times 10^{-10}$
(twentieth plane)

$k = -0.4009$,
$A = -6.89337 \times 10^{-5}$, $B = -1.52572 \times 10^{-6}$,
$C = 1.76743 \times 10^{-8}$, $D = 1.60421 \times 10^{-10}$
(twenty-third plane)

$k = 0$,
$A = -4.81453 \times 10^{-4}$, $B = -1.75639 \times 10^{-5}$,
$C = 1.83475 \times 10^{-6}$, $D = -9.28491 \times 10^{-8}$
(twenty-fourth plane)

$k = -0.2457$,
$A = -4.55109 \times 10^{-4}$, $B = -5.44365 \times 10^{-5}$,
$C = 3.09526 \times 10^{-6}$, $D = -2.17589 \times 10^{-7}$ (Zoom Data)

|       | wide angle edge | intermediate focal position | telephoto edge |
|-------|-----------------|------------------------------|----------------|
| D(7)  | 0.600           | 19.976                       | 28.485         |
| D(14) | 29.696          | 10.320                       | 1.811          |
| D(19) | 9.466           | 4.418                        | 12.865         |
| D(22) | 4.116           | 9.164                        | 0.717          |

(Values related to conditional expression (1))
f51 (focal length of first lens $L_{351}$) = −5.780
Y (image height) = 3.4
|f51|/Y = 1.7
(Values related to conditional expression (2))
F5 (focal length of fifth lens group $G_{35}$) = −32.279
|F5/Ft| = 0.25
(Values related to conditional expression (3))
nd51 (refractive index of first lens $L_{351}$, with respect to d-line) = 1.85135
nd52 (refractive index of second lens $L_{352}$, with respect to d-line) = 1.54814 nd51 − nd52 = 0.303
(Values related to conditional expression (4))
vd12 (Abbe number of second lens $L_{312}$, with respect to d-line) = 95.10
(Values related to conditional expression (5))
vd13 (Abbe number of third lens $L_{313}$, with respect to d-line) = 68.63

FIG. 6 is a diagram of various types of aberration occurring, with respect to the d-line (λ=587.56 nm), in the zoom lens according to the third embodiment. S and M shown with respect to astigmatism, respectively indicate aberration at the sagittal image plane and at the meridonal image plane.

Figure 7:
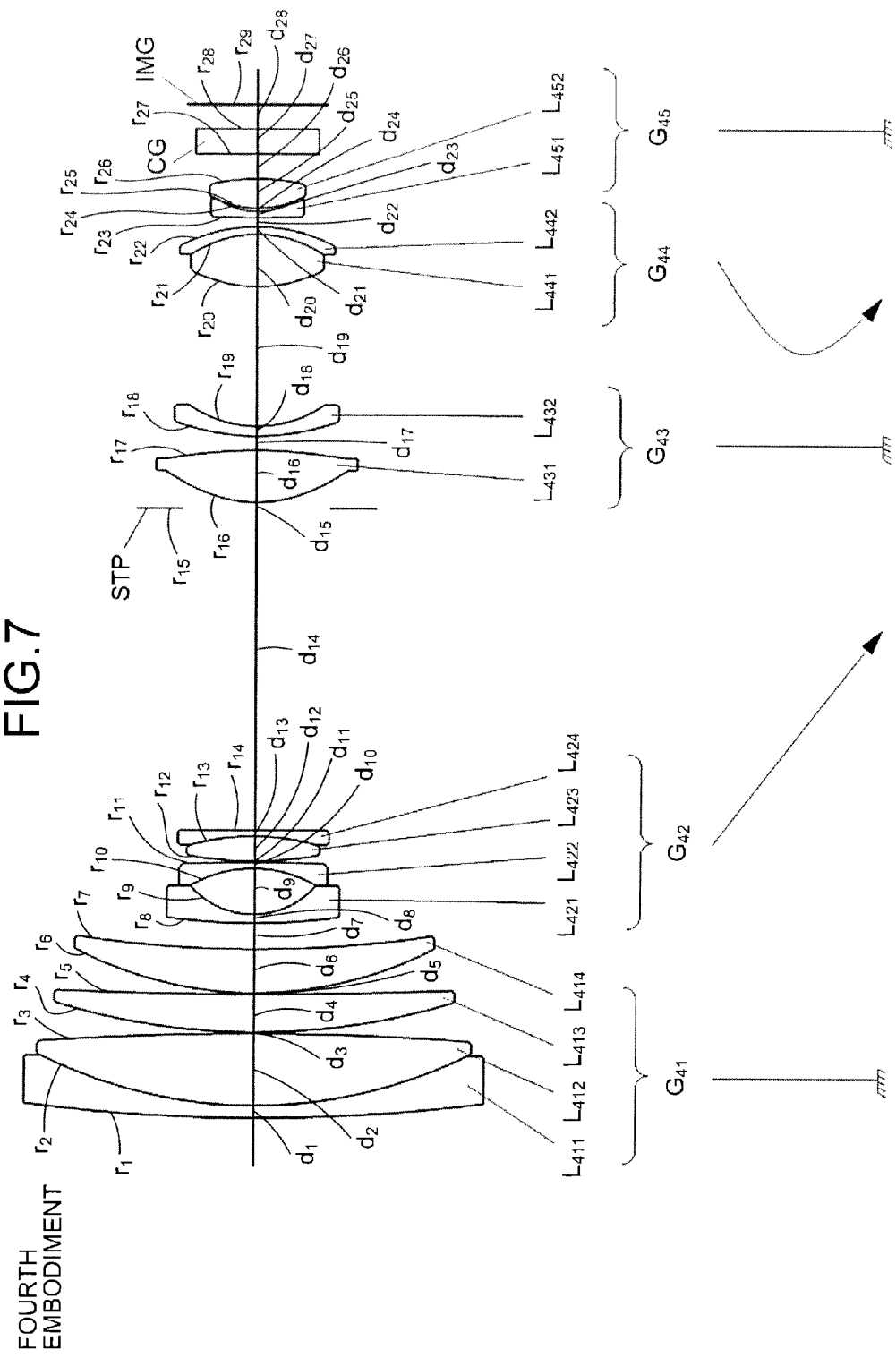
FIG. 7 is a cross sectional view (along the optical axis) of the zoom lens according to a fourth embodiment.

FIG. 7 is a cross sectional view (along the optical axis) of the zoom lens according to a fourth embodiment. The zoom lens includes sequentially from the object side, a first lens group $G_{41}$ having a positive refractive power, a second lens group $G_{42}$ having a negative refractive power, a third lens group $G_{43}$ having a positive refractive power, a fourth lens group $G_{44}$ having a positive refractive power, and a fifth lens group $G_{45}$ having a negative refractive power.

The aperture stop STP prescribing a given aperture is disposed between the second lens group $G_{42}$ and the third lens group $G_{43}$. The cover glass CG is disposed between the fifth lens group $G_{45}$ and the imaging plane IMG. The cover glass CG is disposed as necessary and may be omitted accordingly. At the image plane IMG, the light receiving surface of a solid state image sensor, such as a CCD and CMOS, is disposed.

The first lens group $G_{41}$ includes sequentially from the object side, a negative first lens $L_{411}$, a positive second lens $L_{412}$, a positive third lens $L_{413}$, and a positive fourth lens $L_{414}$. The first lens $L_{411}$ and the second lens $L_{412}$ are cemented.

The second lens group $G_{42}$ includes sequentially from the object side, a negative first lens $L_{421}$, a negative second lens $L_{422}$, a positive third lens $L_{423}$, and a negative fourth lens $L_{424}$. The first lens $L_{421}$ is a meniscus lens having a convex surface on the object side and both surfaces of the first lens $L_{421}$ are aspheric. The third lens $L_{423}$ and the fourth lens $L_{424}$ are cemented.

The third lens group $G_{43}$ includes sequentially from the object side, a positive first lens $L_{431}$ and a negative second lens $L_{432}$. Both surfaces of the first lens $L_{431}$ are aspheric. The second lens $L_{432}$ is a meniscus lens having a convex surface on the object side.

The fourth lens group $G_{44}$ includes sequentially from the object side, a positive first lens $L_{441}$ and a negative second lens $L_{442}$. The surface on the object side of the first lens $L_{441}$ is aspheric. The first lens $L_{441}$ and the second lens $L_{442}$ are cemented.

The fifth lens group $G_{45}$ includes sequentially from the object side, a negative first lens $L_{451}$ and a positive second lens $L_{452}$. Both surfaces of the first lens $L_{451}$ are aspheric.

The second lens group $G_{42}$ is moved along the optical axis from the object side toward the imaging plane IMG side, whereby the zoom lens zooms from the wide angle edge to the telephoto edge. The fourth lens group $G_{44}$ is moved along the optical axis, whereby the zoom lens corrects image plane variations accompanying zooming and performs focusing. The first lens group $G_{41}$, the third lens group $G_{43}$, and the fifth lens group $G_{45}$ remain stationary.

Here, various values related to the zoom lens according to the fourth embodiment are given.

Focal length of entire lens system = 4.3 (wide angle edge) to 24.0 (intermediate focal position) to 129.0 (Ft: telephoto edge)
F number = 1.6 (wide angle edge) to 3.8 (intermediate focal position) to 4.9 (telephoto edge)
Half-angle (ω) = 38.01 (wide angle edge) to 7.10 (intermediate focal position) to 1.32 (telephoto edge)

(Lens Data)

$r_1 = 144.159$
$d_1 = 1.00$   $nd_1 = 1.84666$   $vd_1 = 23.78$

-continued

Focal length of entire lens system = 4.3 (wide angle edge) to 24.0 (intermediate focal position) to 129.0 (Ft: telephoto edge)
F number = 1.6 (wide angle edge) to 3.8 (intermediate focal position) to 4.9 (telephoto edge)
Half-angle (ω) = 38.01 (wide angle edge) to 7.10 (intermediate focal position) to 1.32 (telephoto edge)

$r_2 = 38.899$
$d_2 = 5.80$   $nd_2 = 1.49700$   $vd_2 = 81.60$
$r_3 = -273.198$
$d_3 = 0.10$
$r_4 = 52.998$
$d_4 = 3.31$   $nd_3 = 1.59282$   $vd_3 = 68.63$
$r_5 = 378.875$
$d_5 = 0.10$
$r_6 = 31.113$
$d_6 = 3.57$   $nd_4 = 1.83481$   $vd_4 = 42.72$
$r_7 = 92.838$
$d_7 = D(7)$ (variable)
$r_8 = 76.499$ (aspheric)
$d_8 = 0.70$   $nd_5 = 1.85135$   $vd_5 = 40.10$
$r_9 = 6.041$ (aspheric)
$d_9 = 3.30$
$r_{10} = -12.953$
$d_{10} = 0.50$   $nd_6 = 1.88300$   $vd_6 = 40.80$
$r_{11} = 71.416$
$d_{11} = 0.10$
$r_{12} = 18.115$
$d_{12} = 1.99$   $nd_7 = 1.94594$   $vd_7 = 17.98$
$r_{13} = -26.555$
$d_{13} = 0.50$   $nd_8 = 1.88300$   $vd_8 = 40.80$
$r_{14} = 95.601$
$d_{14} = D(14)$ (variable)
$r_{15} = \infty$ (aperture stop)
$d_{15} = 0.50$
$r_{16} = 11.217$ (aspheric)
$d_{16} = 4.40$   $nd_9 = 1.61881$   $vd_9 = 63.85$
$r_{17} = -25.000$ (aspheric)
$d_{17} = 0.96$
$r_{18} = 22.880$
$d_{18} = 0.60$   $nd_{10} = 2.001$   $vd_{10} = 29.13$
$r_{19} = 10.741$
$d_{19} = D(19)$ (variable)
$r_{20} = 11.970$ (aspheric)
$d_{20} = 4.20$   $nd_{11} = 1.4971$   $vd_{11} = 81.56$
$r_{21} = -9.300$
$d_{21} = 0.60$   $nd_{12} = 1.90366$   $vd_{12} = 31.32$
$r_{22} = -13.445$
$d_{22} = D(22)$ (variable)
$r_{23} = 41.730$ (aspheric)
$d_{23} = 0.50$   $nd_{13} = 1.85135$   $vd_{13} = 40.10$
$r_{24} = 6.749$ (aspheric)
$d_{24} = 0.49$
$r_{25} = 17.244$
$d_{25} = 2.13$   $nd_{14} = 1.56732$   $vd_{14} = 42.80$
$r_{26} = -10.867$
$d_{26} = 1.00$
$r_{27} = \infty$
$d_{27} = 2.00$   $nd_{15} = 1.51633$   $vd_{15} = 64.14$
$r_{28} = \infty$
$d_{28} = 3.50$
$r_{29} = \infty$ (imaging plane)

Constants of the cone (k) and aspheric coefficients (A, B, C, D)

(eighth plane)

$k = 0$,
$A = -2.65503 \times 10^{-4}$, $B = 1.28344 \times 10^{-5}$,
$C = -3.59136 \times 10^{-7}$, $D = 3.83400 \times 10^{-9}$
(ninth plane)

$k = 0.3239$,
$A = -5.45623 \times 10^{-4}$, $B = -7.61065 \times 10^{-6}$,
$C = 7.83466 \times 10^{-7}$, $D = -5.46724 \times 10^{-8}$
(sixteenth plane)

$k = -0.1982$,
$A = -5.20814 \times 10^{-5}$, $B = -1.30668 \times 10^{-6}$,
$C = 1.67967 \times 10^{-8}$, $D = -1.13589 \times 10^{-10}$ -continued Focal length of entire lens system = 4.3 (wide angle edge) to
24.0 (intermediate focal position) to 129.0 (Ft: telephoto edge)
F number = 1.6 (wide angle edge) to 3.8 (intermediate focal
position) to 4.9 (telephoto edge)
Half-angle (ω) = 38.01 (wide angle edge) to 7.10
(intermediate focal position) to 1.32 (telephoto edge)

(seventeenth plane)

k = −6.0844,
A = 7.14760 × 10$^{-5}$, B = −1.84345 × 10$^{-6}$,
C = 2.96044 × 10$^{-8}$, D = −1.85685 × 10$^{-10}$
(twentieth plane)

k = −0.2645,
A = −5.95055 × 10$^{-5}$, B = −1.16644 × 10$^{-6}$,
C = 7.95351 × 10$^{-9}$, D = 3.24336 × 10$^{-10}$
(twenty-third plane)

k = 0,
A = −3.71965 × 10$^{-4}$, B = −2.63704 × 10$^{-5}$,
C = 2.26085 × 10$^{-6}$, D = −6.30326 × 10$^{-8}$
(twenty-fourth plane)

k = 0.0775,
A = −2.57754 × 10$^{-4}$, B = −3.45586 × 10$^{-5}$,
C = 9.86053 × 10$^{-7}$, D = 3.54356 × 10$^{-10}$ (Zoom Data)

|  | wide angle edge | intermediate focal position | telephoto edge |
|---|---|---|---|
| D(7) | 0.897 | 19.167 | 27.163 |
| D(14) | 28.094 | 9.824 | 1.828 |
| D(19) | 10.148 | 4.496 | 14.112 |
| D(22) | 4.564 | 10.216 | 0.600 |

(Values related to conditional expression (1))
f51 (focal length of first lens L$_{451}$) = −9.520
Y (image height) = 3.4
|f51|/Y = 2.8
(Values related to conditional expression (2))
F5 (focal length of fifth lens group G$_{45}$) = −90.419
|F5/Ft| = 0.701
(Values related to conditional expression (3))
nd51 (refractive index of first lens L$_{451}$, with respect to d-line) = 1.85135
nd52 (refractive index of second lens L$_{452}$, with respect to d-line) = 1.56732
nd51 − nd52 = 0.284
(Values related to conditional expression (4))
υd12 (Abbe number of second lens L$_{412}$, with respect to d-line) = 81.60
(Values related to conditional expression (5))
υd13 (Abbe number of third lens L$_{413}$, with respect to d-line) = 68.63

FIG. 8 is a diagram of various types of aberration occurring, with respect to the d-line (λ=587.56 nm), in the zoom lens according to the fourth embodiment. S and M shown with respect to astigmatism, respectively indicate aberration at the sagittal image plane and at the meridonal image plane.

Among the values for each of the embodiments, r$_1$, r$_2$, . . . indicate radii of curvature for each lens, aperture stop surface, etc.; d$_1$, d$_2$, . . . indicate the thickness of the lenses, aperture stop, etc. or the distance between surfaces thereof; nd$_1$, nd$_2$, . . . indicate the refraction index of each lens with respect to the d-line (λ=587.56 nm); and υd$_1$, υd$_2$, . . . indicate the Abbe number of each lens with respect to the d-line (λ=587.56 nm). Lengths are indicated in units of [mm] and angles are indicated in [degrees].

Each of the aspheric surfaces above is expressed by the following equation, where Z is the depth of the aspheric surface, R is the paraxial radius of curvature, h is the height from the optical axis, and the traveling direction of light is positive.

$$Z = \frac{y^2}{R\{1 + 1\sqrt{1-(1+k)y/R^2}\}^2} + Ay^4 + By^6 + Cy^8 + Dy^{10} \quad [1]$$

Further, k is the constant of the cone, and A, B, C, and D are the fourth, the sixth, the eighth, and the tenth order aspheric coefficients, respectively.

As described, the zoom lens of each of the embodiments includes lenses having suitable aspheric surfaces and cemented lenses and by satisfying the conditional expressions above, achieves a large aperture ratio of an F number on the order of 1.6, and can implement an imaging lens that is compact and has high optical performance as well as a high zoom ratio (on the order of 30×) and that is suitable for compact imaging apparatuses equipped with a full high vision solid state image sensors.

As described, the zoom lens according to the present invention is useful for compact imaging apparatuses equipped with a solid state image sensor, such as a digital still camera and a digital video camera. In particular, the zoom lens is optimal for a surveillance camera equipped with a full high vision solid state image sensor.

According to the present invention, resolution of the optical system can be further improved.

According to the present invention, chromatic aberration particularly at the telephoto edge can be favorably corrected.

According to the present invention, spherical aberration and coma over the entire zoom range can be favorably corrected.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

The present document incorporates by reference the entire contents of Japanese priority document, 2012-042554 filed in Japan on Feb. 28, 2012.

What is claimed is:

1. A zoom lens comprises sequentially from an object side, a first lens group having a positive refractive power, a second lens group having a negative refractive power, a third lens group having a positive refractive power, a fourth lens group having a positive refractive power, and a fifth lens group having a negative refractive power, wherein
the first lens group, the third lens group, and the fifth lens group remain stationary,
the second lens group is moved along an optical axis, from the object side toward an image side, whereby zooming from a wide angle edge to a telephoto edge is performed,
the fourth lens group is moved along the optical axis, whereby image plane variation accompanying zooming is corrected and focusing is performed,
the fifth lens group includes sequentially from the object side, a negative first lens having at least one aspheric surface and a positive second lens, and
the zoom lens satisfies:
a conditional expression (1) 1.5<|f51|/Y<3, and
a conditional expression (2) 0.2<|F5/Ft|<0.8,
where, f51 is a focal length of the first lens in the fifth lens group, Y is an image height for the entire optical system, F5 is a focal length of the fifth lens group, and Ft is a focal length of the entire optical system at the telephoto edge.

2. The zoom lens according to claim 1, wherein
the fifth lens group includes the first lens and the second lens, and
the zoom lens satisfies a conditional expression (3) nd51−nd52>0.2,
    where, nd51 is a refractive index (with respect to the d-line) of the first lens in the fifth lens group and nd52 is a refractive index (with respect to the d-line) of the second lens in the fifth lens group.

3. The zoom lens according claim 1, wherein
the first lens group includes sequentially from the object side, a negative first lens, a positive second lens, a positive third lens, and a positive fourth lens,
the first lens and the second lens in the first lens group are cemented, and
the zoom lens satisfies:
    a conditional expression (4) $\upsilon d12>75$, and
    a conditional expression (5) $\upsilon d13>63$,
where, $\upsilon d12$ is an Abbe number (with respect to d-line) of the second lens in the first lens group and $\upsilon d13$ is an Abbe number (with respect to the d-line) of the third lens in the first lens group.

4. The zoom lens according to claim 1, wherein
the third lens group includes sequentially from the object side, a positive first lens having at least one aspheric surface and a negative second lens that is a meniscus lens having a convex surface on the object side.

5. The zoom lens according to claim 2, wherein
the third lens group includes sequentially from the object side, a positive first lens having at least one aspheric surface and a negative second lens that is a meniscus lens having a convex surface on the object side.

* * * * *